United States Patent
DelRegno et al.

(10) Patent No.: US 8,724,461 B2
(45) Date of Patent: *May 13, 2014

(54) METHOD AND SYSTEM FOR PROVIDING AUTO-BANDWIDTH ADJUSTMENT

(75) Inventors: Christopher N. DelRegno, Rowlett, TX (US); Scott R. Kotrla, Wylie, TX (US); Matthew W. Turlington, Richardson, TX (US); Michael U. Bencheck, Richardson, TX (US); Richard C. Schell, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 180 days.

This patent is subject to a terminal disclaimer.

(21) Appl. No.: 13/177,355

(22) Filed: Jul. 6, 2011

(65) Prior Publication Data

US 2011/0261694 A1   Oct. 27, 2011

Related U.S. Application Data

(63) Continuation of application No. 12/168,708, filed on Jul. 7, 2008, now Pat. No. 8,000,240.

(51) Int. Cl.
    *H04L 12/26* (2006.01)
(52) U.S. Cl.
    USPC .......................... 370/232; 709/226
(58) Field of Classification Search
    USPC .................. 370/229–234; 709/223–226
    See application file for complete search history.

(56) References Cited

U.S. PATENT DOCUMENTS

| | | | |
|---|---|---|---|
| 5,953,338 A * | 9/1999 | Ma et al. | 370/395.21 |
| 5,991,268 A | 11/1999 | Awdeh et al. | |
| 6,292,834 B1 * | 9/2001 | Ravi et al. | 709/225 |
| 6,538,991 B1 * | 3/2003 | Kodialam et al. | 370/229 |
| 6,687,228 B1 | 2/2004 | Fichou et al. | |
| 6,912,232 B1 | 6/2005 | Duffield et al. | |
| 6,967,921 B1 | 11/2005 | Levy et al. | |
| 7,193,966 B2 | 3/2007 | Gupta et al. | |
| 7,453,804 B1 | 11/2008 | Feroz et al. | |
| 8,000,240 B2 * | 8/2011 | DelRegno et al. | 370/232 |
| 2003/0007452 A1 * | 1/2003 | Gorti et al. | 370/229 |
| 2003/0007453 A1 * | 1/2003 | Ogier et al. | 370/229 |
| 2003/0112756 A1 * | 6/2003 | Le Gouriellec et al. | 370/230 |
| 2003/0154272 A1 | 8/2003 | Dillon et al. | |
| 2004/0073650 A1 * | 4/2004 | Nakamura | 709/223 |
| 2004/0122938 A1 * | 6/2004 | Messick et al. | 709/224 |
| 2007/0064604 A1 | 3/2007 | Chen et al. | |
| 2007/0159965 A1 | 7/2007 | Kopf et al. | |
| 2007/0177635 A1 | 8/2007 | Kawarai | |
| 2008/0037552 A1 | 2/2008 | Dos Remedios et al. | |
| 2008/0049614 A1 | 2/2008 | Briscoe et al. | |
| 2009/0046583 A1 * | 2/2009 | Towster et al. | 370/232 |

* cited by examiner

Primary Examiner — Jeffrey M Rutkowski

(57) ABSTRACT

An approach is provided for auto-bandwidth adjustment of allocated bandwidth for a traffic tunnel over a network. A determination is made regarding a traffic load over the tunnel, where the tunnel meters traffic in accordance with the bandwidth allocation. A determination is made regarding whether the traffic load triggers an adjustment threshold, where the adjustment threshold is set to provide a desired headroom below the bandwidth allocation. And the bandwidth allocation is adjusted when the adjustment threshold is triggered to provide the desired headroom between the adjusted bandwidth allocation and the traffic load.

19 Claims, 9 Drawing Sheets

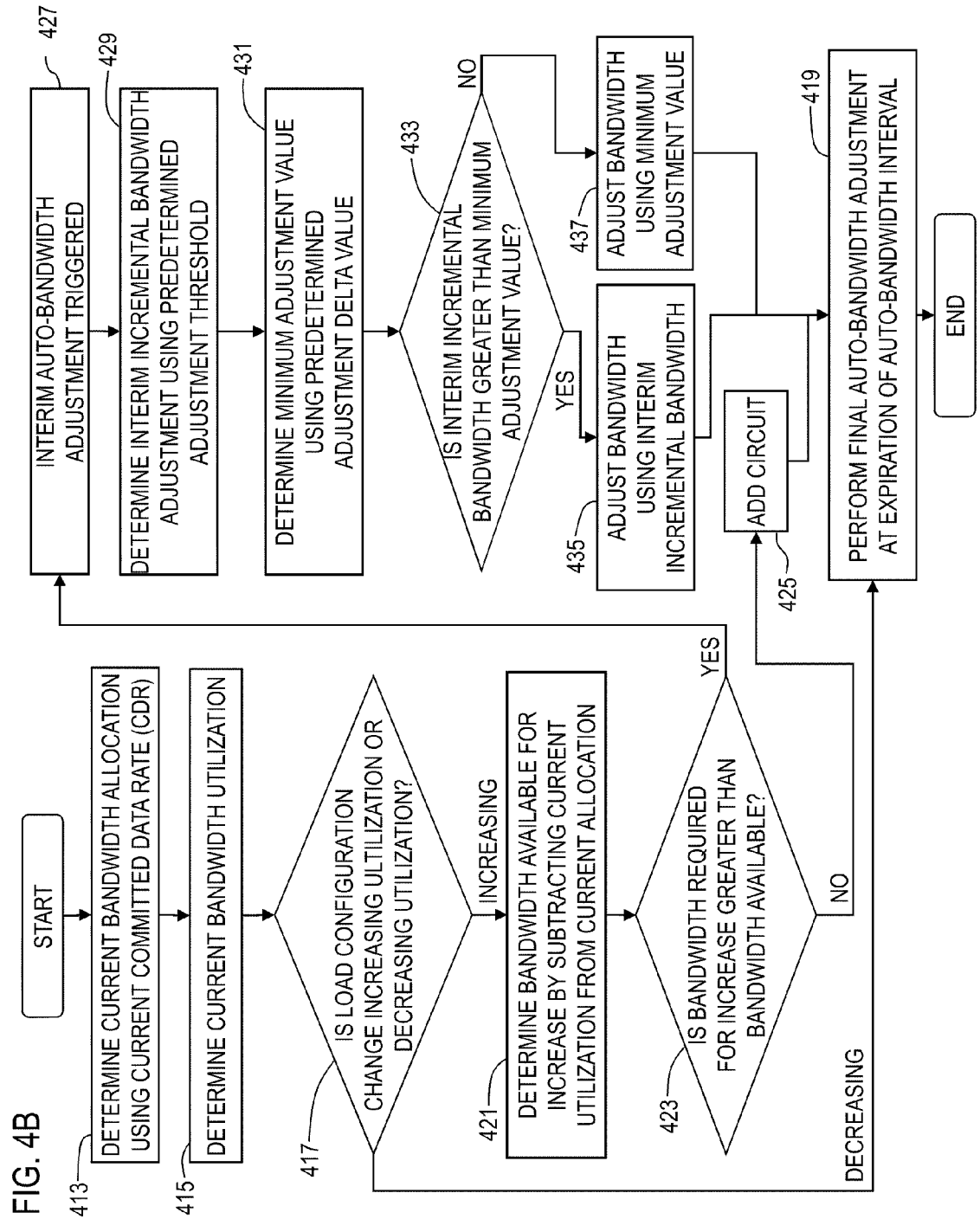

METHOD AND SYSTEM FOR PROVIDING AUTO-BANDWIDTH ADJUSTMENT

RELATED APPLICATION

This application is a continuation of U.S. patent application Ser. No. 12/168,708, filed Jul. 7, 2008, the entirety of which is incorporated herein by reference.

BACKGROUND OF THE INVENTION

Telecommunications networks have developed from connection-oriented, circuit-switched (CO-CS) systems, e.g., such as the public switched telephone network (PSTN), utilizing constant bit-rate, predefined point-to-point connections to connectionless, packet-switched (CNLS) systems, such as the Internet, utilizing dynamically configured routes characterized by one or more communication channels divided into arbitrary numbers of variable bit-rate channels. With the increase in demand for broadband communications and services, telecommunications service providers are beginning to integrate long-distance, large-capacity optical communication networks with these traditional CO-CS and CNLS systems. Typically, these optical communication networks utilize multiplexing transport techniques, such as time-division multiplexing (TDM), wavelength-division multiplexing (WDM), and the like, for transmitting information over optical fibers. However, an increase in demand for more flexible, resilient transport is driving optical communication networks toward high-speed, large-capacity packet-switching transmission techniques, wherein switching and transport functions occur in optical states via one or more packets.

Such optical communication networks can experience significant fluctuations in traffic due to many factors; such as increases or decreases in the number of customers allocated to use the network and/or components of the network, changes in the structure of the network that increase of decrease capacity of the network and/or of components of the network, and fluctuations in usage that can be somewhat predictable or cyclical in nature, as well as random or bursty in nature. Typically, if the amount of traffic attempting to use resources of the optical communication network allocated thereto exceeds the capacity of the allocated resources, then excess data will be lost until the situation is resolved.

Therefore, there is a need for an approach that provides packet-based networks with efficient techniques for automatically adjusting bandwidth allocations in response to traffic fluctuations and capacity reconfigurations.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 4B is a flowchart of a process for automatically adjusting bandwidth allocations during an auto-bandwidth interval including performing an interim auto-bandwidth adjustment, according to an exemplary embodiment;

DESCRIPTION OF THE PREFERRED EMBODIMENT

An apparatus, method, and software for providing automatic bandwidth adjustments in response to traffic fluctuations and capacity reconfigurations over packet-based networks are described in this document. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various exemplary embodiments are described with respect to label switching networks, it is contemplated that the various exemplary embodiments are also applicable to other equivalent transport networks, such as circuit-switched, burst-switched, packet-switched, wavelength-switched, multi-protocol label-switched, etc., networks.

Figure 1:
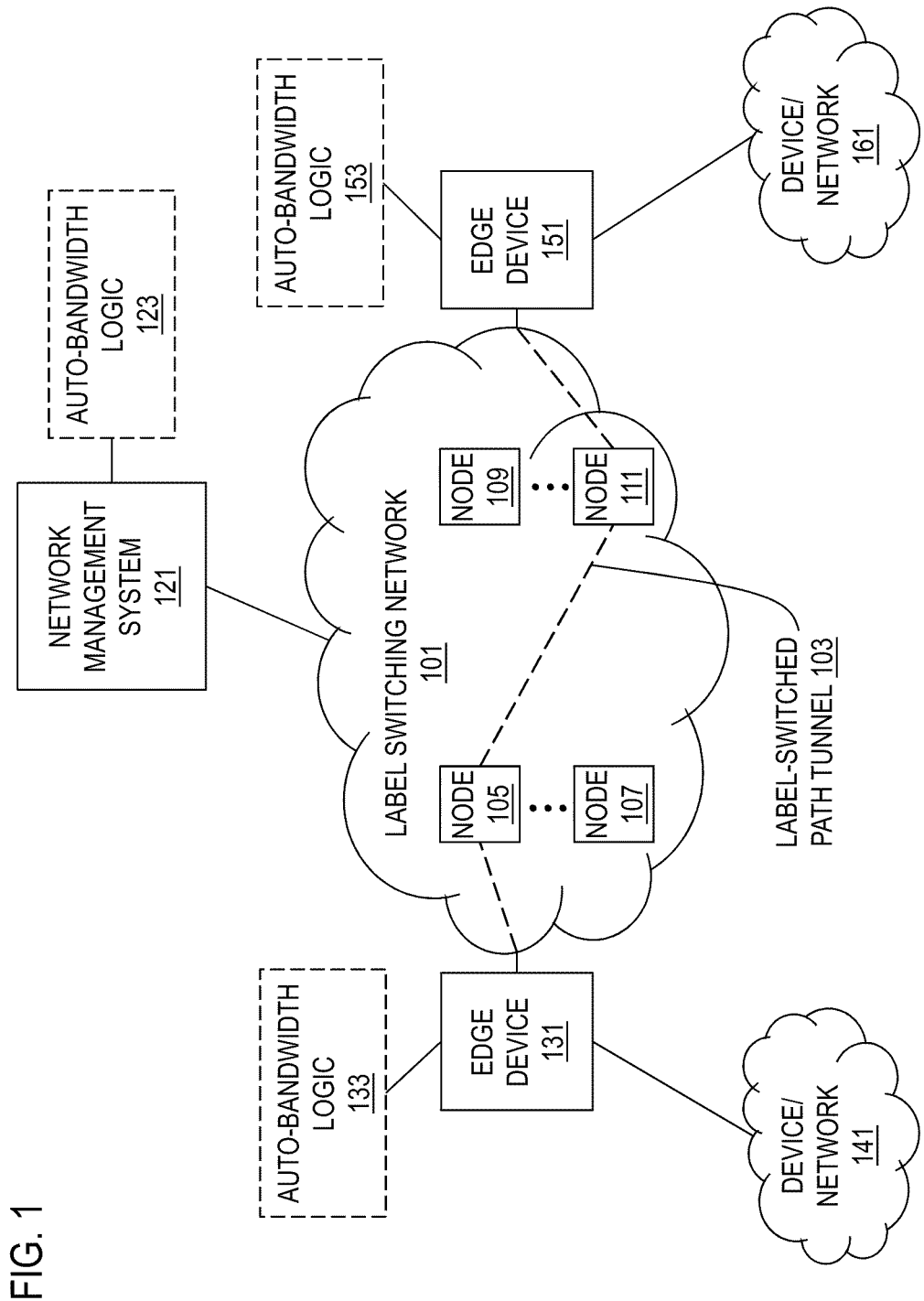
FIG. 1 is a system diagram of a label switching network utilizing auto-bandwidth logic to adjust label-switched path tunnels, according to an exemplary embodiment.

FIG. 1 is a system diagram of a label switching network 101 utilizing auto-bandwidth logic to adjust label-switched path tunnels or traffic-engineered tunnels, according to an exemplary embodiment. The label switching network 101 includes a plurality of nodes (e.g., label switching routers) 105, 107, 109, 111, etc., that are used to route communications between a device and/or network 141 and a device and/or network 161 by establishing a label-switched path tunnel 103 (e.g., from node 105 and node 111 in this exemplary instance). Thus, for example, when device/network 141 requests establishment of communications with device/network 161, an edge device (e.g., a label edge ingress/egress router) 131 provides a connection between the device/network 141 and one of the nodes, such as nodes 105, 107, etc., which provides the label-switched path tunnel 103 to another node, such as nodes 109, 111, etc. An edge device (e.g., a label edge ingress/egress router) 151 provides a connection between the node (i.e., node 109, 111, etc.) acting as the egress node for the label-switched path tunnel 103 and the device/network 161. It is noted that the edge devices 131 and 151 can be provided as components of the label switching network 101, at respective device/networks, or as separate components from the networks depicted.

The label switching network 101 includes a network management system 121 that can be used to monitor, analyze and control the operation of the label switching network 101. As noted previously, auto-bandwidth logic (e.g., auto-bandwidth logic 123, auto-bandwidth logic 133, and/or auto-bandwidth logic 153) is provided to adjust label-switched path tunnels. The auto-bandwidth logic can be provided, for example, as auto-bandwidth logic 123 component of the network management system 121, and/or as auto-bandwidth logic 133 and 153 as components of the edge devices 131 and 151, respectively. If provided as auto-bandwidth logic 123 as a component of the network management system 121, then the auto-bandwidth logic 123 can be used to control one or more of the edge device(s) used in conjunction with the label switching network 101.

As an example of the auto-bandwidth logic, a label switching network could be configured as a multi-protocol label switching (MPLS) network, and the MPLS network can be provided with an MPLS auto-bandwidth logic that automatically sizes the label switched paths (LSPs) in the MPLS network based on demand, instead of based upon pre-provisioning in advance. While it is possible for the auto-bandwidth logic to use an algorithm that triggers an auto-bandwidth resizing function based on connection admission control (CAC) for Layer 2 circuits or via traffic sampling for Layer 3 (IP) and virtual private LAN (local area network) service (VPLS) traffic, these algorithms can be problematic if triggered only when a new L2 circuit is added which causes the required committed data rate (CDR) to exceed current CDR, or when the Layer 3 and/or VPLS sampled rate exceeds current CDR. Such algorithms are problematic because in the period between successive adjustment intervals, which can be quite long, traffic that exceeds the current CDR is typically dropped, even if network capacity is sufficient to transport the data. Furthermore, such algorithms may utilize an algorithm adjustment size that is a function of a minimum adjustment size. For example, if a minimum adjustment size is set at 1%, since the effective adjustment size is a function of this value, then the adjustment sizes can be quite large for 1 GbE (Gigabit Ethernet) and 10 GbE interfaces, thereby needlessly wasting traffic engineering capacity in the network. These restrictions may require a network manager to over-engineer and then over-subscribe the traffic engineering information for the network. Also, for a VPLS whose traffic flows vary widely with time, such restrictions can cause a lot of loss when the network is warming up in the morning or between large swings in bandwidth.

Accordingly, embodiments of algorithms are set forth herein that utilize auto-bandwidth adjustments, while providing head-room in the LSPs for burstiness or circuit adds in between auto-provisioning adjustment intervals. Such algorithms advantageously provide a threshold of CDR date rate at which auto bandwidth is triggered in order to proactively correct problems before data is lost.

Figure 2:
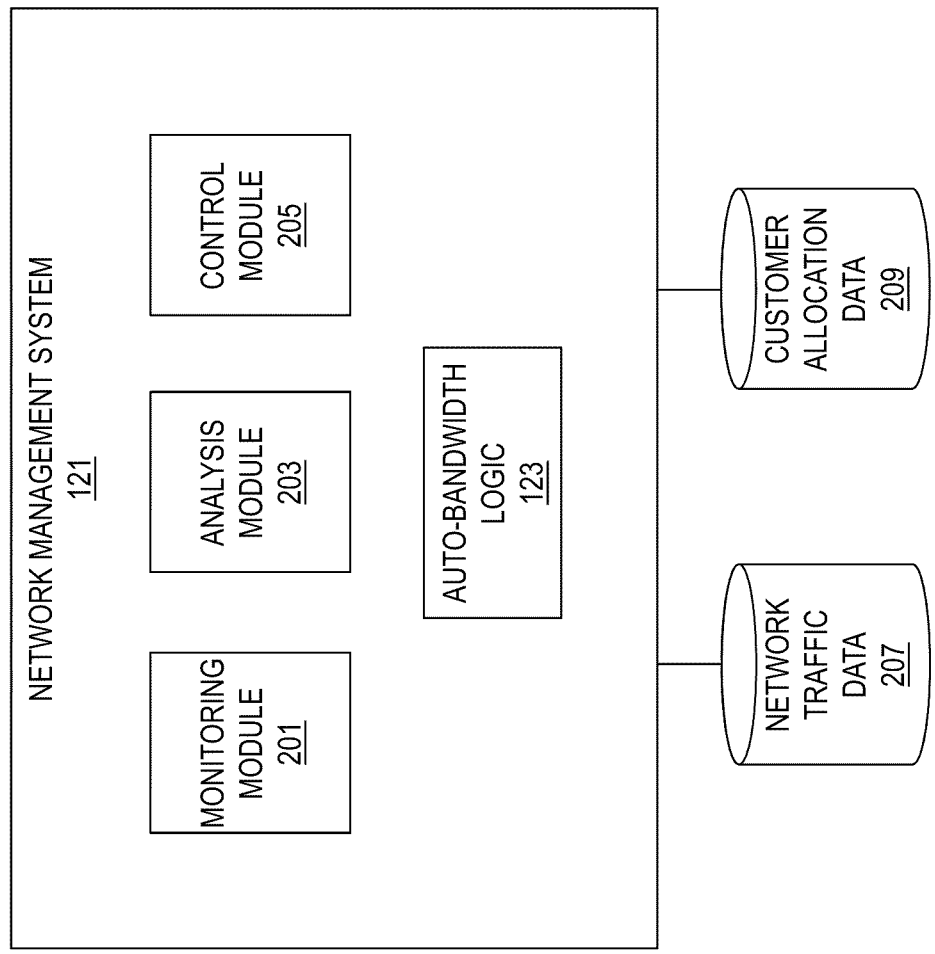
FIG. 2 is a schematic diagram of a network management system incorporating an auto-bandwidth logic used to adjust label-switched path tunnels, according to an exemplary embodiment.

FIG. 2 is a schematic diagram of a network management system 121 incorporating an auto-bandwidth logic 123 used to adjust label-switched path tunnels, according to an exemplary embodiment. The auto-bandwidth logic 123 (and/or auto-bandwidth logic 133, and/or auto-bandwidth logic 153) utilizes such an advantageous algorithm discussed in the previous paragraph.

The network management system 121 includes a monitoring module 201, an analysis module 203, and a control module 205. Additionally, a network traffic data database 207 and a customer allocation data database 209 are provided either as components of the network management system 121 or as separate components that are accessible by the network management system 121.

The monitoring module 201 can be configured to collect data regarding the operation of the label switching network 101. For example, by monitoring one or more of label switched path tunnel 103, node 105, node 107, node 109, node 111, edge device 131, and/or edge device 151, the monitoring module can take samples of traffic flow rates throughout the network 101. For example, the monitoring module 201 can be used to sample traffic flow rates at regular intervals. The monitoring module 201 may also be able to monitor current network resources to determine, for example, current capacity, current resource problems, etc. The sampled traffic flow rates and other information collected by the monitoring module 201 can be stored in the network traffic data database 207 for later analysis.

The customer allocation data database 209 can be used to store various information related to the network and allocations of the network, for example, current bandwidth allocations for customers, current CDRs, current network resources, etc. The analysis module 203 can access both the network traffic data database 207 and the customer allocation data database 209 in order to perform an analysis of the data stored thereon. Additionally, the analysis module 203 can access or can include auto-bandwidth logic 123 in order to access and perform the auto-bandwidth algorithm therein.

The control module 205 can be configured to control any adjustments to the label switching network 101 that are determined using the auto-bandwidth algorithm.

Embodiments described herein include an auto-bandwidth algorithm that utilizes an adjustment trigger (also referred to as an adjustment threshold), $A_t$, which is a true threshold parameter, above which auto-bandwidth adjustment is triggered. It is noted that, in order to provide backwards compatibility with methods that do not utilize such a parameter, adjustment trigger can be set to equal a committed data rate (CDR) of the label-switched path (LSP). The auto-bandwidth algorithm further utilizes an adjustment delta, $A_d$, which is a parameter that provides a minimum adjustment size for changing an LSP's CDR, either up or down.

Through the use of the adjustment trigger and adjustment delta parameters, along with the calculations discussed below, the auto-bandwidth algorithm can be tuned to support configurable LSP headroom. Also, as noted above, by setting the adjustment trigger to 0, the algorithm can ensure backwards compatibility. Additionally, a combination of both adjustment trigger and adjustment delta parameters can allow for configurable head-room in the LSP, while allowing the adjustment delta to control the size of the auto-bandwidth. Furthermore, regarding negative adjustments, the adjustment trigger parameter will ensure the appropriate head-room at the new, lower CDR.

Figure 3:
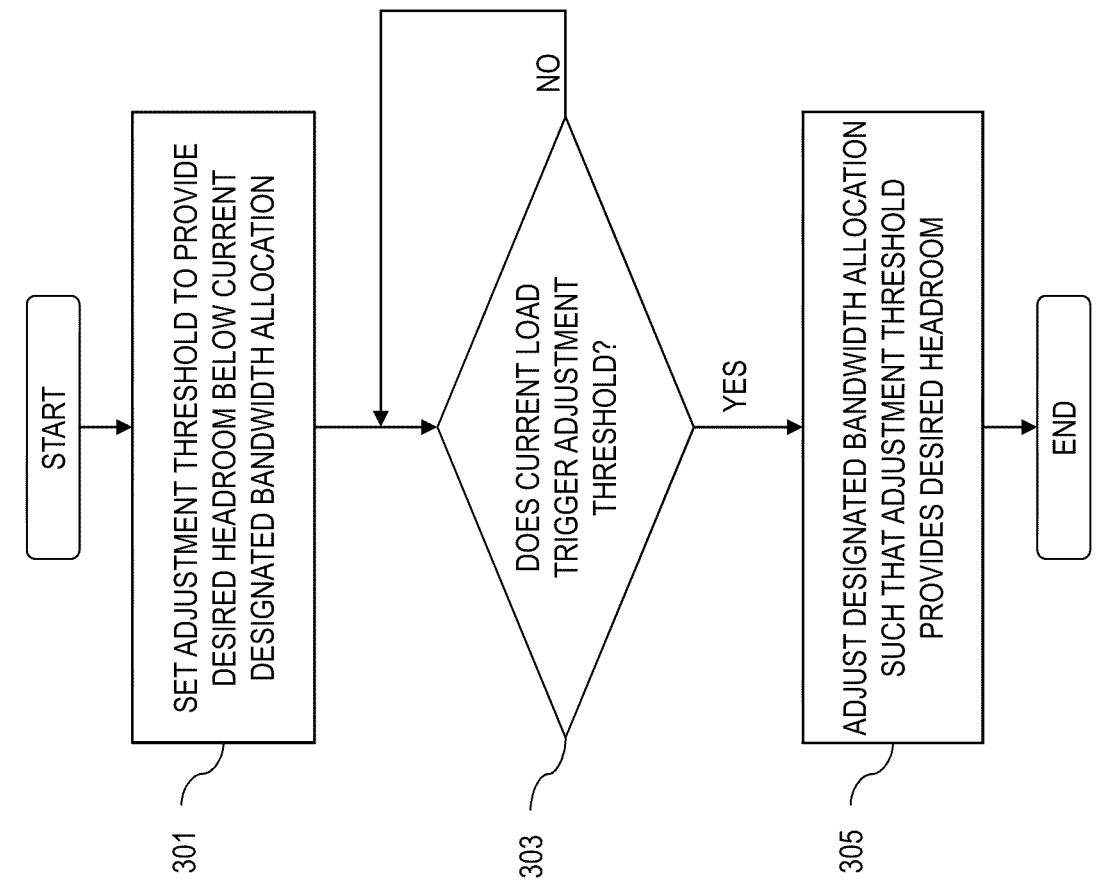
FIG. 3 is a flowchart of a process for automatically adjusting bandwidth allocations to reduce or prevent loss of data during fluctuations in traffic and/or capacity changes, according to an exemplary embodiment.

FIG. 3 is a flowchart of a process for automatically adjusting bandwidth allocations to reduce or prevent loss of data during fluctuations in traffic and/or capacity changes, according to an exemplary embodiment. In step 301, an adjustment threshold is set to provide a desired headroom below a current designated bandwidth allocation. For example, if the current designated bandwidth allocation for a given LSP is defined using a CDR of 200 Mbps, and a desired headroom (which can be set as a percentage or a number value) is 10% or 20 Mbps, then an adjustment threshold (which can be set as a percentage or a number value) of 10% would be required. In step 303, the process determines whether the current load triggers the adjustment threshold (e.g., if the current load is greater than 90% of the CDR (i.e. over 180 Mbps), then the adjustment threshold would be triggered). If the adjustment threshold is not triggered, then the process could loop back to 303 again at intervals. Otherwise, upon determining that the current load does trigger the adjustment threshold, then the process would proceed to step 305, where the designated bandwidth allocation would be adjusted such that the adjustment threshold provides the desired headroom for the new current load (e.g., if the current CDR is 200 Mbps, the current load is 190 Mbps, and the desired headroom and adjustment threshold are 10%, then the designated bandwidth allocation is adjusted to 211.111 Mbps).

FIGS. 4A-5B set forth flowcharts of exemplary processes for automatically adjusting bandwidth allocations, which generally perform such processes in regular auto-bandwidth intervals. The processes set forth in FIGS. 4A-4C not only perform auto-bandwidth adjustments at the expiration of the auto-bandwidth intervals, but also allow for interim auto-bandwidth adjustments for networks that include situations with possible interim load configuration changes. The processes set forth in FIGS. 5A-5B perform auto-bandwidth adjustments at the expiration of the auto-bandwidth intervals based upon actual traffic flow rates sampled during the auto-bandwidth interval.

Figure 4A:
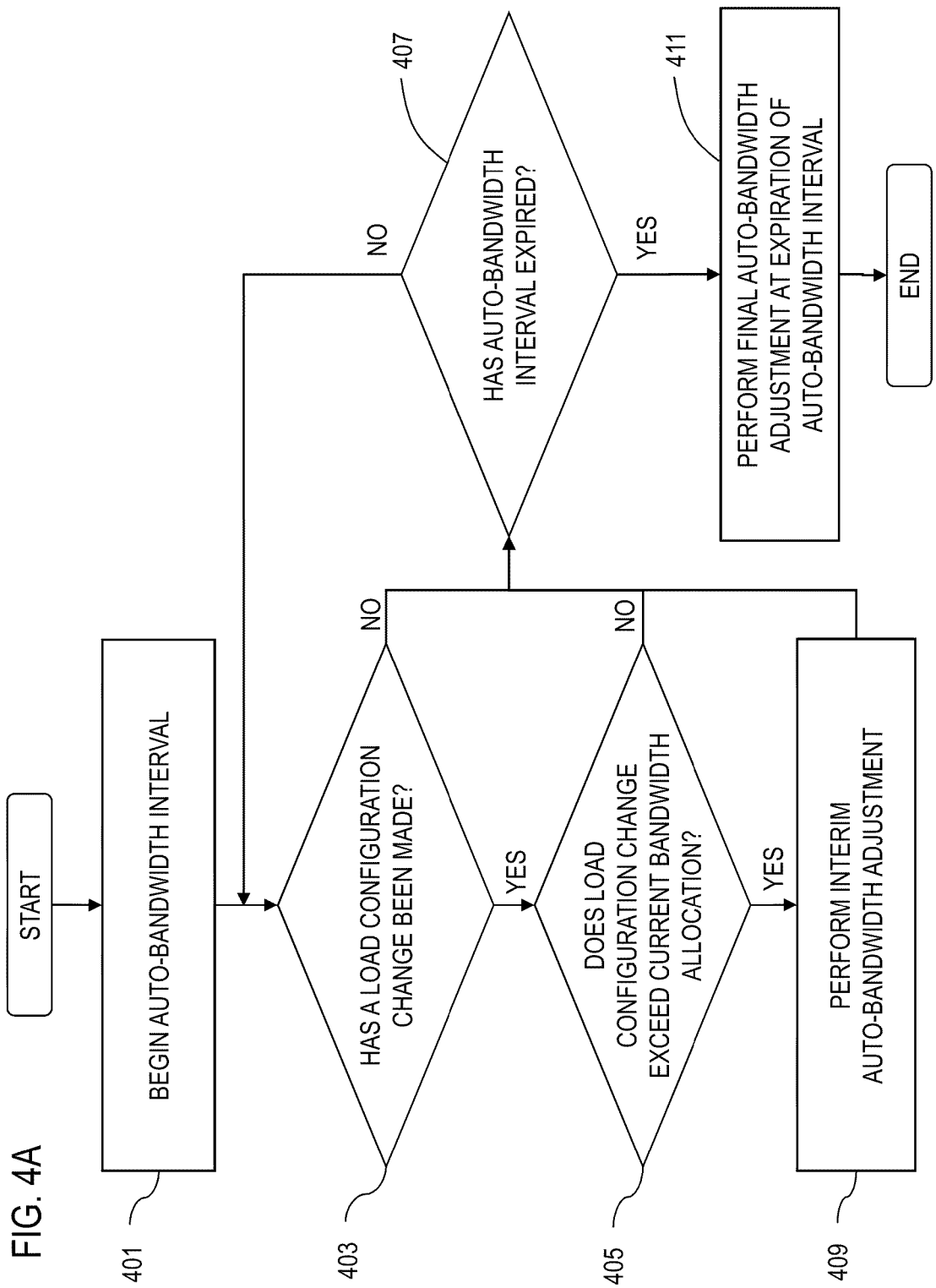
FIG. 4A is a flowchart of a process for automatically adjusting bandwidth allocations during an auto-bandwidth interval including interim auto-bandwidth adjustments and final auto-bandwidth adjustments at expiration of the interval, according to an exemplary embodiment.
Figure 4C:
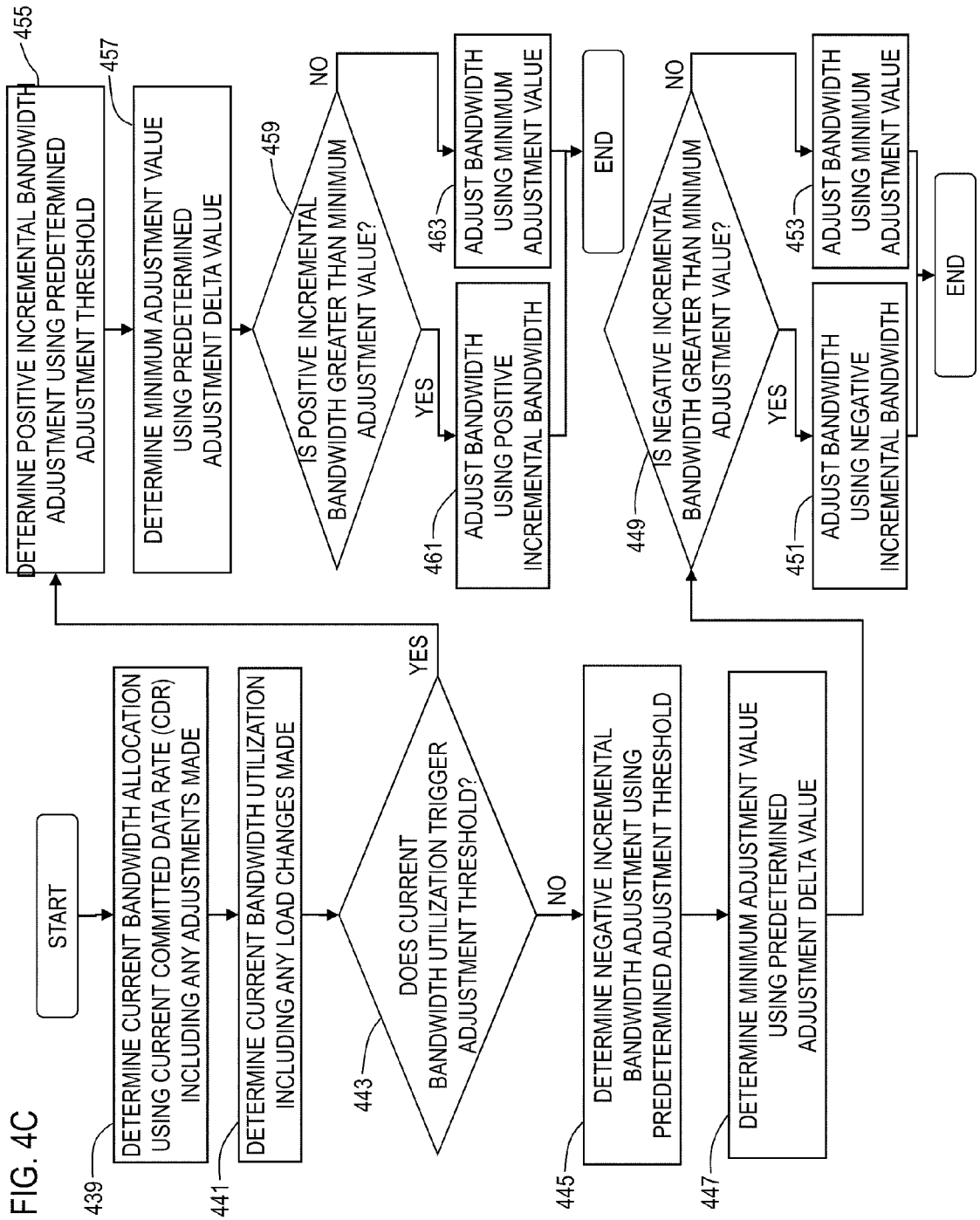
FIG. 4C is a flowchart of a process for automatically adjusting bandwidth allocations during an auto-bandwidth interval including performing final auto-bandwidth adjustments at expiration of the interval, according to an exemplary embodiment.

Auto-Bandwidth Adjustment Algorithm Including Situations with Possible Interim Load Configuration Changes:

The following is a description of an adjustment algorithm that can be advantageously used to resize the auto-bandwidth function in situations where interim load configuration changes to the network are possible (e.g., when an L2 circuit is added, removed, or otherwise adjusted). FIGS. 4A-4C set forth flowcharts of processes that will be referenced in the following discussion of this embodiment of the adjustment algorithm.

FIG. 4A provides a general summary of the process for automatically adjusting bandwidth allocations, which not only performs auto-bandwidth adjustments at the expiration of the auto-bandwidth interval, but also allows for interim auto-bandwidth adjustments for networks that include situations with possible interim load configuration changes. The process starts in step 401 by beginning an auto-bandwidth interval. In step 403, it is determined whether a load configuration change has been made, for example, when an L2 circuit is added, removed, or otherwise adjusted. If a load configuration change has been made, then the process proceeds to step 405 where it is determined whether or not the load configuration change exceeds the current bandwidth allocation. If the load configuration change exceeds the current bandwidth allocation, then the process proceeds to step 409 where an interim auto-bandwidth adjustment is performed to correct the overload. If the determinations in either of steps 403 or 405 are negative, or if step 409 has been completed, then the process proceeds to step 407 where it is determined whether or not the auto-bandwidth interval has expired. If the auto-bandwidth interval has not expired, then the process loops back to step 403. However, if the auto-bandwidth interval has expired, then the process proceeds to step 411 where a final auto-bandwidth adjustment is performed. Then, the process can be repeated, as desired, for a new auto-bandwidth interval.

FIG. 4B provides a more detailed flowchart of steps taken during the interval in order to check for and perform interim auto-bandwidth adjustments, if needed, and FIG. 4C provides a more detailed flowchart of steps taken during the final auto-bandwidth adjustments at the expiration of the interval.

In step 413 of FIG. 4B, the current bandwidth allocation is determined using the committed data rate (CDR). For a given traffic class n, assume that a current label-switched path (LSP) auto-bandwidth-signaled CDR is K, then the LSP bandwidth available (or current bandwidth allocation), $A_n$, for L2 in class n is:

$$A_n = (K \times E_n \times (1-(V_n - I_n))), \quad \text{(Eq. 1)}$$

where $E_n$ is an ELSP profile set for the LSP (e.g., a multi-service router platform may support four classes per ELSP and can allocate bandwidth among the classes based on percentages set in the ELSP profiles, such as E0, E1, E2, and E3, where the classes are UBR (unspecified bitrate), VBRnrt (variable bitrate), VBRrt (variable bitrate), and CBR (constant bitrate) (note that the algorithm is independent of the number of classes and can accommodate additional or fewer classes than described here);

where $V_n$ is VPLS (virtual private LAN (local area network) service) profile percentages, which determine an amount of bandwidth available for VPLS in each class on the LSP (e.g., $V_n$ can be set for the classes to 100%, 100%, 100%, 100%, respectively, to prevent EVPL (ethernet virtual private line) circuits from using the VPLS-dedicated LSPs; and where $I_n$ are IP profile percentages, which determine an amount of bandwidth available for IP traffic in each class on the LSP.

At this stage, it can be useful to determine current bandwidth utilization (step 415) and to determine whether a load configuration change being made will increase utilization or decrease utilization (step 417). If the change will decrease utilization, for example if a L2 circuit is removed from the auto-bandwidth LSP, then the adjustment to lower the bandwidth is not done immediately, but rather, it is performed when the next adjust interval expires (step 419). If, however, the load configuration change will increase utilization, then the process proceeds to step 421.

In step 421, the bandwidth available for increase is determined by subtracting the current bandwidth utilization from the current bandwidth allocation. Thus, if the total L2 bandwidth for class n already set by connection admission control (CAC) is $X_n$ (i.e., current utilization), then the available bandwidth (or bandwidth available for increase) $L_n$ for new L2 circuits in class n is:

$$L_n = A_n - X_n. \quad \text{(Eq. 2)}$$

In step 423, it is determined whether the bandwidth required for increase is greater than the bandwidth available for increase. Thus, if a new L2 circuit of class n requires bandwidth (or bandwidth required for increase) $R_n$ that is less than $L_n$, then the circuit is added to the LSP (step 425). No further action is required until the next auto-bandwidth adjustment interval expires (step 419). Even if the addition of the L2 circuit causes the new value of $X_n$ to exceed the level dictated by the adjustment trigger ($A_t$), no immediate auto-bandwidth action is performed.

However, if the bandwidth required for increase is greater than the bandwidth available, then the process proceeds to step 427 where an interim auto-bandwidth adjustment is triggered. Thus, if a new L2 circuit of class n requires bandwidth $R_n$ that is greater than $L_n$, then auto-bandwidth is immediately triggered. Then, in step 429 an interim incremental bandwidth adjustment value is determined using a predetermined adjustment threshold value. The interim incremental bandwidth $IB_n$ will be:

$$IB_n = \left(\frac{X_n + R_n}{1 - A_t}\right) - X_n \quad \text{(Eq. 3)}$$

provided that this value is greater than a minimum adjustment value, as determined in steps 429, 431, 433, and 435. The minimum adjustment value is:

$$J_n = (\text{MAX} - \text{MIN}) \times E_n \times (1 - V_n - I_n) \times A_d. \quad \text{(Eq. 4)}$$

where MIN equals an auto-bandwidth minimum setting on the LSP for which auto-bandwidth has been enabled (i.e., the lowest bandwidth to which the LSP will be adjusted); and where MAX equals an auto-bandwidth maximum setting on the LSP for which auto-bandwidth has been enabled (i.e., the highest bandwidth to which the LSP will be adjusted).

Otherwise, the adjustment is given by $J_n$, as determined in steps 429, 431, 433, and 437.

It is noted that the adjustment delta ($A_d$) can range from 0% to 100%. The usage of both parameters, ($A_t$ and $A_d$) provides two means of tuning the auto-bandwidth algorithm. If either parameter is set to 0, then the other parameter governs the auto-bandwidth behavior. If both are set to 0, then auto-bandwidth allocates only enough capacity to exactly match the bandwidth set by CAC for all classes within the LSP.

As noted in step 419 in FIG. 4B and in the process set forth in FIG. 4C, at the expiration of the auto-bandwidth interval, a final auto-bandwidth adjustment is performed. In step 439, the current bandwidth allocation is determined using the CDR (see discussion of step 413) including any adjustments made during the interval, and in step 441, the current bandwidth utilization is determined (see discussion of step 415) including any load changes that were made during the interval. Then, in step 443, it is determined whether the current bandwidth utilization triggers the adjustment threshold. Thus, at the expiration of the next auto-bandwidth adjustment interval, if:

$$X_n > A_n(1 - A_t), \quad \text{(Eq. 5)}$$

(i.e., the determination in step 443 is that the current bandwidth utilization does trigger the adjustment threshold), then auto-bandwidth is triggered, and the process proceeds to step 455, in which a positive incremental bandwidth $IB_n$ will be:

$$IB_n \left(\frac{X_n}{1 - A_t}\right) - X_n. \quad \text{(Eq. 6)}$$

This will ensure that the CDR for the LSP is sized appropriately to maintain the capacity "headroom" provided by the adjustment trigger ($A_t$) parameter.

At this stage, the minimum adjustment value will be determined in step 457 (see discussion in step 431), and if the positive incremental bandwidth is greater than the minimum adjustment value (step 459), then the bandwidth adjustment will be made using the positive incremental bandwidth (step 461), but if the positive incremental bandwidth is not greater than the minimum adjustment value (step 459), then the bandwidth adjustment will be made using the minimum adjustment value (step 463).

If, however, $$X_n < A_n(1 - A_t), \quad \text{(Eq. 7)}$$

(i.e., the determination in step 443 is that the current bandwidth utilization does not trigger the adjustment threshold), then auto-bandwidth is triggered, and the process proceeds to step 445, in which a negative incremental bandwidth $IB_n$ will be:

$$IB_n = 0 - (A_n - (X_n(1 + A_t))), \quad \text{(Eq. 8)}$$

for each value of n where n=(0, 1, 2, 3). The use of the adjustment threshold, $A_t$, here ensures that the resultant LSP bandwidth will provide the specified headroom for each class.

At this stage, the minimum adjustment value will be determined in step 447 (see discussion in step 431), and if the negative incremental bandwidth is greater than the minimum adjustment value (step 449), then the bandwidth adjustment will be made using the negative incremental bandwidth (step 451), but if the negative incremental bandwidth is not greater than the minimum adjustment value (step 449), then the bandwidth adjustment will be made using the minimum adjustment value (step 453).

In each of Examples 1-4 described below, the following assumptions will be made: (1) the service provided is an EVPL service in which all circuits are of VBRrt in nature (or n=2); (2) an ELSP is used, where the ELSP profile is set to 0%, 0%, 100%, 0%, respectively for classes 0, 1, 2, and 3; (3) n=2: (i.e., class 2 (VBRrt)); and (4) MAX equals 1000 Mbps and MIN equal 150 Mbps.

Example 1

In Example 1, the adjustment threshold ($A_t$) is set at 10%, and the adjustment delta ($A_d$) is set at 0%.

For a given LSP with CDR is K=200 Mbps, then the LSP bandwidth available $A_n$ for class 2 using Eq. 1 is:

$$A_2 = (200 \text{ Mbps} \times 100\% \times (1 - 0 - 0)) = 200 \text{ Mbps}.$$

If the total L2 bandwidth for Class 2 already set by CAC is $X_2 = 180$ Mbps, then, using Eq. 2, the available bandwidth $L_2$ for a new L2 circuit in Class 2 is:

$$L_2 = 200 \text{ Mbps} - 180 \text{ Mbps} = 20 \text{ Mbps}.$$

For a new L2 Circuit of Class 2 which requires $R_2 = 4$ Mbps, then $X_2 = 184$ Mbps, which is still smaller than $A_2$, and thus there is no immediate adjustment to the LSP. Now $L_2 = 16$ Mbps, which means that there is 16 Mbps available in the LSP. The LSP will continue at this present size until the next auto-bandwidth adjustment interval. Prior to the expiration of the auto-bandwidth interval, this process can be repeated until $X_2$ exceeds $A_2$.

At the expiration of the auto-bandwidth adjustment interval, the following test is performed using Eq. 5:

$$X_2 > A_2(1 - A_t),$$

$$184 \text{ Mbps} > 200 \text{ Mbps}(1 - 0.1),$$

$$184 \text{ Mbps} > 180 \text{ Mbps}, \text{ which is therefore TRUE}.$$

As a result of $X_2$ now exceeding the limit dictated by $A_t$, the LSP auto-bandwidth algorithm runs. Thus, using Eq. 6, the incremental bandwidth will be the larger of $IB_2$ or $J_2$:

$$IB_2 = \left(\frac{184 \text{ Mbps}}{1 - .1}\right) - 184 \text{ Mbps},$$

$$IB_2 = 20.\overline{444} \text{ Mbps, and}$$

using Eq. 4, the minimum adjustment value is:

$$J_2 = (1000 \text{ Mbps} - 150 \text{ Mbps}) \times 100\% \times (1 - 0 - 0) \times 0\%,$$

$$J_2 = (850 \text{ Mbps}) \times 0 = 0 \text{ Mbps}.$$

Since $IB_2$ is greater than $J_2$, the adjustment made will be $IB_2$ or 20.444 Mbps, for a new CDR of K=204.444 Mbps.

Now, the LSP is resized to accommodate the overhead provided by $A_t$ through the value in $IB_2$, so that $A_2$ now has 204.444 Mbps of capacity, which causes $X_2$ to be $(1-A_t)$ or 90% of $A_2$, yielding the desired 10% headroom. Since the adjustment delta $(A_d)$ was set to 0, $J_2$ has no effect on the auto-bandwidth calculation.

Example 2

However if the new L2 Circuit of Class 2 had required 25 Mbps, then an immediate adjustment is required since the resulting $L_2$ would be negative. The incremental bandwidth will be equal to the larger of $IB_2$ (using Eq. 3) or $J_2$ (using Eq. 4):

$$IB_2 = \left(\frac{180 \text{ Mbps} + 25 \text{ Mbps}}{1 - .1}\right) - 180 \text{ Mbps},$$

$$IB_2 = 47.\overline{777} \text{ Mbps, and}$$

$$J_2 = (1000 \text{ Mbps} - 150 \text{ Mbps}) \times 100\% \times (1 - 0 - 0) \times 0\%,$$

$$J_2 = (850 \text{ Mbps}) \times 0 = 0 \text{ Mbps}.$$

Since $IB_2$ is greater than $J_2$, the adjustment made will be $IB_2$ or 47.777 Mbps, for a new CDR of K=227.777 Mbps.

If either of the L2 circuits added above (e.g. 4 Mbps or 25 Mbps) is removed, the amount of the set CAC L2 bandwidth for Class 2 ($X_2$) drops back to 180 Mbps. In either case, the resultant excess capacity for Class 2 ($L_2$) in the LSP is now below the bandwidth required to satisfy the adjustment threshold ($A_t$), however, no immediate action is taken.

At the expiration of the auto-bandwidth adjustment interval, the following will be TRUE:

For Example 1:

$$X_2 < A_2(1-A_t),$$

180 Mbps<204.$\overline{444}$ Mbps(1−0.1),

180 Mbps<184 Mbps, which is therefore TRUE, and

For Example 2:

$$X_2 < A_2(1-A_t),$$

180 Mbps<227.$\overline{777}$(1−0.1),

180 Mbps<205 Mbps, which is therefore TRUE.

Therefore, auto-bandwidth is triggered, and the incremental bandwidth $IB_M$, which is negative in these instances, will be:

For Example 1:

$$IB_2 = 0 - (A_2 - (X_2(1+A_t))),$$

$$IB_2 = 0 - (204.\overline{444} \text{ Mbps} - (180 \text{ Mbps}(1+0.1))),$$

$$IB_2 = -6.\overline{444} \text{ Mbps, and}$$

For Example 2:

$$IB_2 = 0 - (A_2 - (X_2(1+A_t))),$$

$$IB_2 = 0 - (227.\overline{777} \text{ Mbps} - (180 \text{ Mbps}(1+0.1))),$$

$$IB_2 = -29.\overline{777} \text{ Mbps}$$

In either example, the result of the negative incremental bandwidth, brings the available bandwidth for Class 2 ($A_2$) down to 198 Mbps, providing the 10%, or 18 Mbps, of headroom guaranteed by the adjustment threshold value.

As there are four classes in the current implementations (i.e., Examples 1 and 2), the auto-bandwidth algorithm performs the negative incremental bandwidth calculation for all four classes and applies the resultant sum to the overall LSP CDR. The use of the Adjustment Threshold here ensures that the resultant LSP bandwidth will provide the specified headroom for each class, based on their configured share of the LSP bandwidth as determined by the ELSP, VPLS and IP Profiles.

When the adjustment threshold $(A_t)$ is set to zero and is used in conjunction with the adjustment delta $(A_d)$, then the system performs in an identical fashion as systems not using such factors.

The following additional examples are the same as above, but with $(A_d)$ dominating the adjustment.

Example 3

The adjustment threshold $(A_t)$ is set equal to 0%, and the adjustment delta $(A_d)$ is set equal to 10%.

For a given LSP with CDR where K=200 Mbps, then the LSP bandwidth available $A_n$ for class 2 is:

$A_2 = (200 \text{ Mbps} \times 100\% \times (1-0-0)) = 200 \text{ Mbps}.$

If the total L2 bandwidth for Class 2 already set by CAC as $X_2$=180 Mbps, then the available bandwidth $L_2$ for a new L2 circuit in Class 2 is:

$L_2 = 200 \text{ Mbps} - 180 \text{ Mbps} = 20 \text{ Mbps}.$

For a new L2 Circuit of Class 2 which requires $R_2$=4 Mbps, then $X_2$=184 Mbps, which is still smaller than $A_2$, and there is no immediate adjustment to the LSP. Now $L_2$=16 Mbps, meaning there is 16 Mbps available in the LSP. The LSP will continue at this present size until the next auto-bandwidth adjustment interval. Prior to the expiration of the auto-bandwidth interval, this process can be repeated until $X_2$ exceeds $A_2$.

At the expiration of the auto-bandwidth adjustment interval, the following test is performed:

$$X_2 > A_2(1-A_t),$$

184 Mbps>200 Mbps(1−0),

184 Mbps>200 Mbps, which is therefore FALSE.

Since $X_2$ does not exceed the limit dictated by $A_t$, the LSP auto-bandwidth algorithm does not run.

Example 4

However if the new L2 Circuit of Class 2 had required 25 Mbps, then an immediate adjustment is required since the resulting $L_2$ would be negative. The incremental bandwidth will be equal to the larger of $IB_2$ (Eq. 3) or $J_2$ (Eq. 4):

$$IB_2 = \left(\frac{X_2 + R_2}{1 - A_t}\right) - X_2,$$

$$IB_2 = \left(\frac{180 \text{ Mbps} + 25 \text{ Mbps}}{1 - 0}\right) - 180 \text{ Mbps},$$

$$IB_2 = 25 \text{ Mbps, and}$$

$$J_2 = (1000 \text{ Mbps} - 150 \text{ Mbps}) \times 100\% \times (1 - 0 - 0) \times 10\%,$$

$$J_2 = (850 \text{ Mbps}) \times 0.1 = 85 \text{ Mbps}.$$

Since $J_2$ is greater than $IB_2$, the adjustment made will be $J_2$, or 85 Mbps, for a new CDR of K=265 Mbps.

If either of the L2 circuits added above (e.g. 4 Mbps or 25 Mbps) is removed, the amount of set CAC L2 Bandwidth for Class 2 ($X_2$) drops back to 180 Mbps. In either case, the resultant excess capacity for Class 2 ($L_2$) in the LSP is now below the bandwidth required to satisfy the adjustment threshold ($A_t$), however, no immediate action is taken.

At the expiration of the auto-bandwidth adjustment interval, the negative adjustment occurs exactly as before since the incremental bandwidth equation $IB_n$ does not contain the adjustment delta ($A_d$). The resulting decrease in capacity will result in a set CAC L2 Bandwidth for Class 2 ($X_2$) of 180 Mbps, leaving no headroom.

Thus, the previous examples demonstrate the two extremes where one parameter controls the bandwidth adjustment and the other is zero. There are innumerable permutations between these extremes, which are not set forth herein. However, the combination of the two parameters would provide great flexibility in using auto-bandwidth within the network. One particular example would be where the adjustment delta ($A_d$) is sufficiently large to dominate the increase in incremental bandwidth ($IB_n$) with the adjustment threshold ($A_t$) controlling the negative resizing of the LSP to maintain predetermined headroom.

Auto-Bandwidth Adjustment Algorithm for Sampled Traffic Rate Changes:

The following is a description of an adjustment algorithm that can be advantageously used to resize the auto-bandwidth function based upon sampled traffic rates (e.g., when sampled Layer 3 and/or VPLS traffic exceeds a current CDR setting).

Figure 5A:
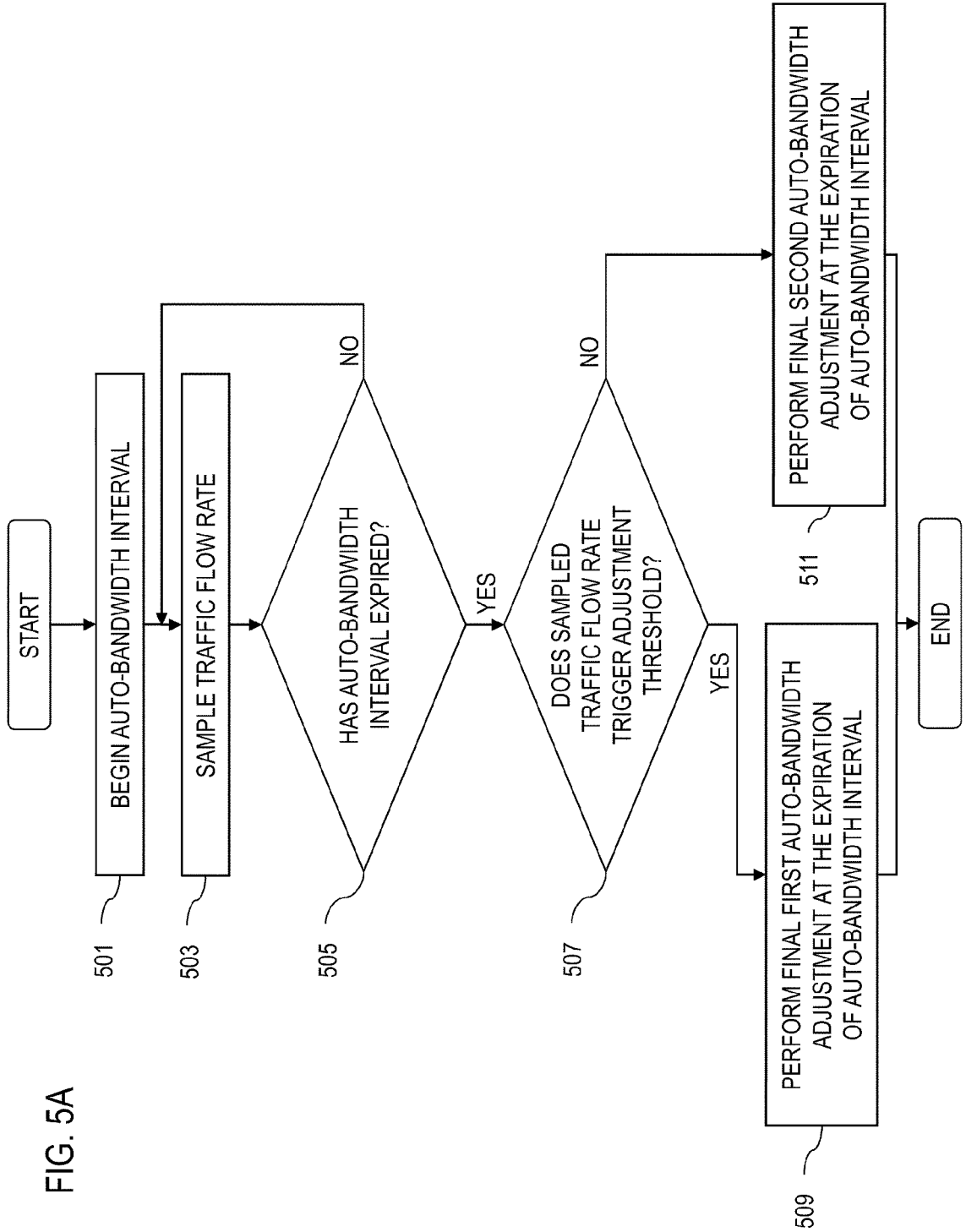
FIG. 5A is a flowchart of a process for automatically adjusting bandwidth allocations during an auto-bandwidth interval using sampled traffic flow rates, according to an exemplary embodiment.

FIG. 5A provides a general summary of the process for automatically adjusting bandwidth allocations, which performs auto-bandwidth adjustments at the expiration of the auto-bandwidth interval based on sampled traffic flow rates. The process begins in step 501 by beginning an auto-bandwidth interval, and in step 503 the traffic flow rate is sampled. In step 505, it is determined whether or not the auto-bandwidth interval has expired, and if the auto-bandwidth interval has not expired then the process loops back to step 503, and if the auto-bandwidth interval has expired then the process proceeds to step 507. In step 507, it is determined whether or not the sampled traffic flow rate triggers the adjustment threshold. If the sampled traffic flow rate does trigger the adjustment threshold, then the process proceeds to step 509 where a first version of the final auto-bandwidth adjustment is performed at the expiration of the auto-bandwidth interval. If the sampled traffic flow rate does not trigger the adjustment threshold, then the process proceeds to step 511 where a second version of the final auto-bandwidth adjustment is performed at the expiration of the auto-bandwidth interval.

Figure 5B:
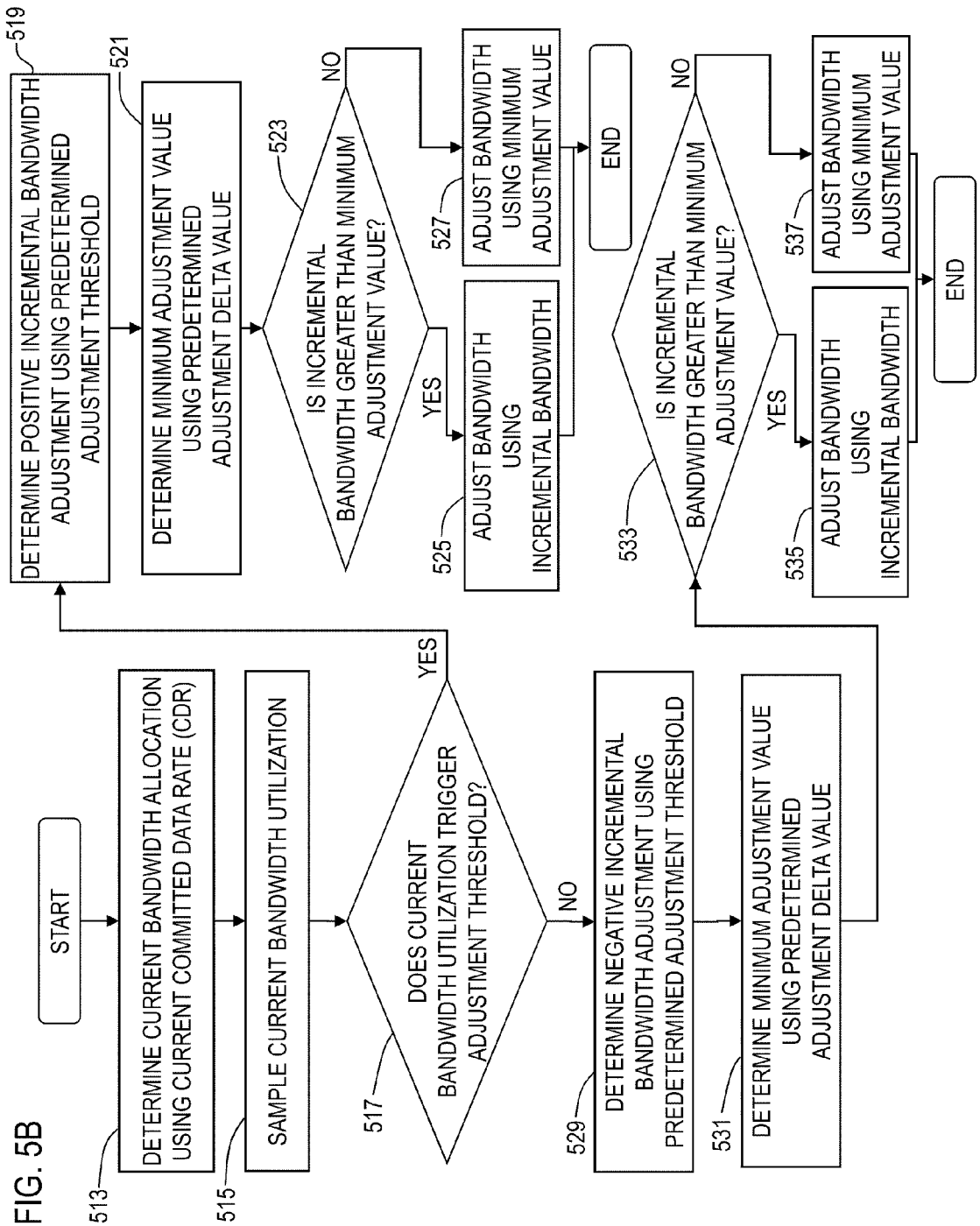
FIG. 5B is a flowchart of a process for automatically adjusting bandwidth allocations during an auto-bandwidth interval including performing final auto-bandwidth adjustments at expiration of the interval using sampled traffic flow rates taken during the interval, according to an exemplary embodiment.

FIG. 5B provides a more detailed flowchart of steps taken during the interval and during the final auto-bandwidth adjustments at the expiration of the interval.

In step 513, the current bandwidth allocation is determined using the CDR. For a given traffic class n, assume that the current LSP auto-bandwidth-signaled committed-data-rate (CDR) is K, then bandwidth available (or current bandwidth allocation), $C_n$, for VPLS in class n is:

$$C_n = (K \times E_n \times V_n). \tag{Eq. 9}$$

In step 515, the current bandwidth utilization is sampled, and then in step 517 it is determined whether or not current bandwidth utilization triggers the adjustment threshold. If the measured VPLS rate for class n in the last sample interval is $Z_n$, then auto-bandwidth increase is triggered at the expiration of the adjust interval if $Z_n$ is greater than the current threshold value of the available VPLS bandwidth (i.e., the process proceeds to steps 519, 521, and 523), as governed by the adjustment threshold ($A_t$) parameter:

$$Z_n > C_n(1-A_t), \tag{Eq. 10}$$

and if true (i.e., in step 517 the determination is made that the current bandwidth utilization does trigger the adjustment threshold), then auto-bandwidth is triggered, and the incremental bandwidth $IB_n$ will be:

$$IB_n = \left(\frac{Z_n}{1-A_t}\right) - C_n, \tag{Eq. 11}$$

provided that this value is greater than a minimum adjustment value (i.e., the determination in step 523 is that the incremental bandwidth is greater than the minimum adjustment value, ands thus proceed to step 525). The minimum adjustment value is:

$$J_n = (MAX-MIN) \times E_n \times V_n \times A_d. \tag{Eq. 12}$$

Otherwise, the adjustment is given by $J_n$ (i.e., the determination in step 523 is that the incremental bandwidth is not greater than the minimum adjustment value and thus proceed to step 527).

It is noted that the adjustment delta ($A_d$) can range from 0% to 100%. The usage of both parameters, ($A_t$ and $A_d$) provides two means of tuning the auto-bandwidth algorithm. If either parameter is set to 0, then the other parameter governs the auto-bandwidth behavior. If both are set to 0, then auto-bandwidth allocates only enough capacity to exactly match the sampled bandwidth for all classes within the LSP.

Like the L2 CAC portion of the algorithm, if at the expiration of the auto-bandwidth adjust interval the sampled bandwidth is less than adjustment threshold of the bandwidth available for class n provided by the currently signaled Committed Data Rate (K) of the LSP (i.e., the process proceeds to steps 529, 531, and 533), the auto-bandwidth is triggered and a negative bandwidth adjustment is performed.

At the expiration of the next auto-bandwidth adjustment interval, if:

$$Z_n < C_n(1-A_t), \tag{Eq. 13}$$

(i.e., the determination in step 517 is that the current bandwidth utilization does not trigger the adjustment threshold) then auto-bandwidth is triggered, and, in step 529, the incremental bandwidth $IB_n$, negative in this instance, will be:

$$IB_n = 0 - (C_n - (Z_n(1+A_t))), \tag{Eq. 14}$$

for each value of n where n=(0, 1, 2, 3). The use of the adjustment threshold here ensures that the resultant LSP bandwidth will provide the specified headroom for each class.

At this stage, the minimum adjustment value will be determined in step 531 (see step 521), and if the negative incremental bandwidth is greater than the minimum adjustment value (step 533), then the bandwidth adjustment will be made using the negative incremental bandwidth (step 535), but if the negative incremental bandwidth is not greater than the minimum adjustment value (step 533), then the bandwidth adjustment will be made using the minimum adjustment value (step 537).

In each of Examples 5-8 described below, the following assumptions will be made: (1) the service provided is a VPLS service in which all traffic will be of VBRnrt or UBR in nature (i.e., class 1 (n=1) or class 0 (n=0)); (2) the ELSP profile is set to 100%, 100%, 100%, and 100%, respectively for classes 0, 1, 2, and 3; (3) the VPLS profile is 100%, 100%, 0%, and 0% for class 0, class 1, class 2 and class 3, respectively; (4) n=class 1 (VBRrt); and (5) MAX equals 1000 Mbps and MIN equals 150 Mbps.

Example 5

In Example 5, the adjustment threshold ($A_t$) is set to 10%, and the adjustment delta ($A_d$) is set to 0%.

For a given LSP with current CDR which is K=200 Mbps, then the LSP bandwidth available $C_n$ for class 1 is:

$C_1$=(200 Mbps×$E_1$×$V_1$), $C_1$=(200 Mbps×1×1)=200 Mbps.

If the measured VPLS rate for class 1 ($Z_1$) in the last sample interval is 190 Mbps, then auto-bandwidth increase is triggered at the expiration of the adjust interval if 190 Mbps is greater than the current threshold of available VPLS bandwidth, as governed by the adjustment threshold ($A_t$) parameter:

$Z_1$>$C_1$(1−$A_t$),

190 Mbps>200 Mbps(1−0.1),

190 Mbps>180 Mbps is TRUE, therefore, auto-bandwidth is triggered, and the incremental bandwidth $IB_n$ is:

$$IB_1 = \left(\frac{Z_1}{1-A_t}\right) - C_1,$$

$$IB_1 = \left(\frac{190 \text{ Mbps}}{1-.9}\right) - 200 \text{ Mbps},$$

$$IB_1 = 11.\overline{111} \text{ Mbps},$$

provided that this value is greater than a minimum adjustment value. The minimum adjustment value is given by:

$J_1$=(MAX−MIN)×$E_1$×$V_1$×$A_d$, $J_1$=(1000 Mbps−150 Mbps)×100%×100%×0%, $J_1$=0 Mbps, therefore, an increase of 11.111 Mbps is made to LSP Committed Data Rate (K), resulting in 211.111 Mbps in class 1, to maintain the provisioned headroom above the running average of VPLS traffic within class 1.

Example 6

In Example 6, the adjustment threshold ($A_t$) is set to 10%, and the adjustment delta ($A_d$) is set to 0%.

For a given LSP with current CDR which is K=200 Mbps, then the LSP bandwidth available $C_n$ for class 1 is:

$C_1$=(200 Mbps×$E_1$×$V_1$), $C_1$=(200 Mbps>1×1)=200 Mbps.

If the measured VPLS rate for class 1 ($Z_1$) in the last sample interval is 230 Mbps, then auto-bandwidth increase is triggered at the expiration of the adjust interval if 230 Mbps is greater than the current threshold of available VPLS bandwidth, as governed by the adjustment threshold ($A_t$) parameter:

$Z_1$>$C_1$(1−$A_t$),

230 Mbps>200 Mbps(1−0.1),

230 Mbps>180 Mbps is TRUE, therefore, auto-bandwidth is triggered, and the incremental bandwidth $IB_n$ will be:

$$IB_1 = \left(\frac{Z_1}{1-A_t}\right) - C_1,$$

$$IB_1 = \left(\frac{230 \text{ Mbps}}{1-.9}\right) - 200 \text{ Mbps},$$

$$IB_1 = 55.\overline{555} \text{ Mbps},$$

provided that this value is greater than a minimum adjustment value. The minimum adjustment value is given by:

$J_1$=(MAX−MIN)×$E_1$×$V_1$×$A_d$, $J_1$=(1000 Mbps−150 Mbps)×100%×100%×0%, $J_1$=0 Mbps, therefore, an increase of 55.555 Mbps is made to the LSP Committed Data Rate (K) to maintain the provisioned headroom above the running average of VPLS traffic within class 1.

Example 7

In Example 7, the adjustment threshold ($A_t$) is set to 0%, and the adjustment delta ($A_d$) is set to 10%.

For a given LSP with current CDR which is K=200 Mbps, then the LSP bandwidth available $C_n$ for class 1:

$C_1$=(200 Mbps×$E_1$×$V_1$), $C_1$=(200 Mbps×1×1)=200 Mbps.

If the measured VPLS rate for class 1 ($Z_1$) in the last sample interval is 190 Mbps, then auto-bandwidth increase is triggered at the expiration of the adjust interval if 190 Mbps is greater than the current threshold of available VPLS bandwidth, as governed by the adjustment threshold ($A_t$) parameter:

$Z_1$>$C_1$(1−$A_t$),

190 Mbps>200 Mbps(1−0.1),

190 Mbps>180 Mbps is TRUE, therefore, auto-bandwidth is triggered, and the incremental bandwidth $IB_n$ will be:

$$IB_1 = \left(\frac{Z_1}{1-A_t}\right) - C_1,$$

$$IB_1 = \left(\frac{190 \text{ Mbps}}{1-0}\right) - 200 \text{ Mbps},$$

$$IB_1 = 0 \text{ Mbps},$$

provided that this value is greater than a minimum adjustment value. The minimum adjustment value is given by:

$J_1$=(MAX−MIN)×$E_1$×$V_1$×$A_d$, $J_1$=(1000 Mbps−150 Mbps)×100%×100%×10%, $J_1$=85 Mbps, therefore, an increase of 85 Mbps is made to LSP Committed Data Rate (K).

Example 8

In Example 8, the adjustment threshold (1) is set to 10%, and the adjustment delta ($A_d$) is set to 0%.

Referring to Example 5, similar to the L2 CAC examples, if at the expiration of the auto-bandwidth adjust interval, the sampled bandwidth for Class 1 ($Z_1$) drops to 150 Mbps, auto-bandwidth is triggered.

At the expiration of the next auto-bandwidth adjustment interval, if:

$$Z_1 < C_1(1-A_t),$$

$$150 \text{ Mbps} < 211.\overline{111} \text{ Mbps}(1-0.1),$$

$$150 \text{ Mbps} < 190 \text{ Mbps is TRUE},$$

auto-bandwidth is triggered, and the incremental bandwidth $IB_n$, negative in this instance, will be:

$$IB_n = 0 - (C_1 - (Z_1(1+0.1))),$$

$$IB_n = 0 - (211.111 \text{ Mbps} - (150 \text{ Mbps}(1+0.1))),$$

$$IB_n = -46.\overline{111} \text{ Mbps}$$

for n=1. In this example, the resulting value of K would be 165 Mbps. The same algorithm would be run for all classes and the sum of $IB_n$ would be used to decrease the committed data rate (K) of the LSP. The use of the adjustment threshold here ensures that the resultant LSP bandwidth will provide the specified headroom for each class.

As with the L2 CAC examples (i.e., Examples 1-4), the preceding examples (i.e., Examples 5-8) demonstrate the two extremes where one parameter controls the bandwidth adjustment and the other is zero. There are innumerable permutations between these extremes. The combination of the two parameters provides great flexibility in using auto-bandwidth within the network. One particular example would be where the adjustment delta ($A_d$) is sufficiently large to dominate the increase in incremental bandwidth ($IB_n$) with the adjustment threshold ($A_t$) controlling the negative resizing of the LSP to maintain pre-determined headroom.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
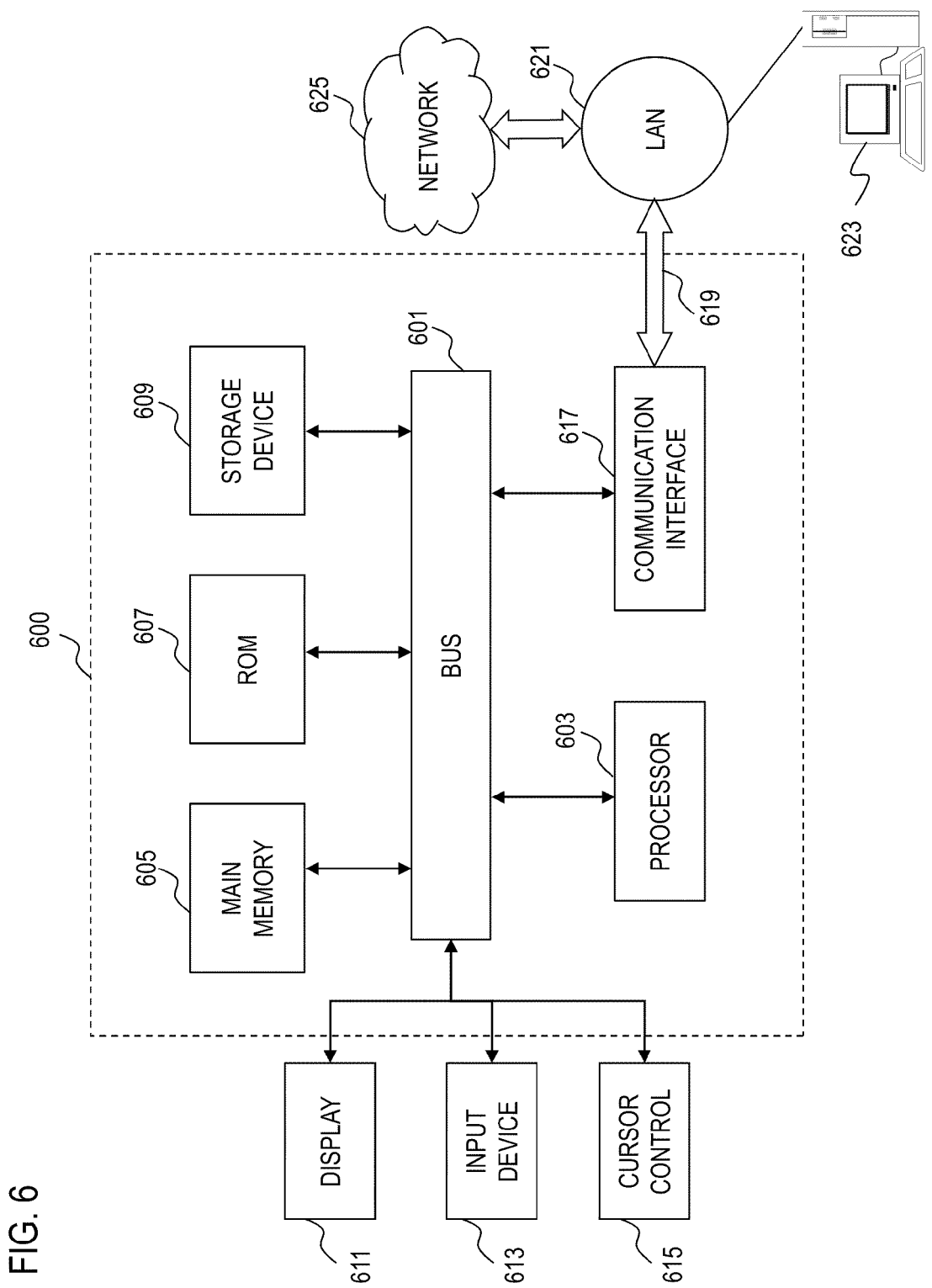
FIG. 6 is a diagram of a computer system that can be used to implement various exemplary embodiments.

FIG. 6 illustrates computing hardware (e.g., computer system) 600 upon which an embodiment according to the invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements.

What is claimed is:

1. A method comprising:
    setting, by a processor, a predetermined delta value to control an adjustment threshold value to an auto-bandwidth value;
    determining, by the processor, an incremental bandwidth value using the adjustment threshold value;
    determining, by the processor, a minimum adjustment value based on the predetermined delta value and the incremental bandwidth value; and
    adjusting, by the processor, the auto-bandwidth value according to the greater of the minimum adjustment value or the incremental bandwidth value.

2. A method according to claim 1, wherein the adjustment threshold value specifies a desired headroom with respect to the auto-bandwidth value, the method further comprising:
    sampling current traffic to determine whether to adjust the auto-bandwidth according to the adjustment threshold.

3. A method according to claim 1, wherein the adjustment to the auto-bandwidth value is an interim adjustment relating to a temporary fluctuation of a current traffic load.

4. A method according to claim 3, further comprising:
    determining the auto-bandwidth value, wherein the auto-bandwidth value represents a current bandwidth allocation;
    determining whether bandwidth utilization is increased or decreased based on a current load configuration to execute the adjustment to the auto-bandwidth value.

5. A method according to claim 3, further comprising:
    configuring an auto-bandwidth interval; and
    determining expiration of the auto-bandwidth interval to perform the adjustment to the auto-bandwidth value.

6. A method according to claim 1, wherein the auto-bandwidth value specifies bandwidth allocation relating to a label switched path.

7. A method according to claim 6, wherein the auto-bandwidth value is set according to an allocation scheme based on a plurality of profiles specifying percentages for a plurality of traffic classes.

8. A method according to claim 7, wherein the profiles include an Ethernet virtual private profile, a virtual private LAN (local area network) service profile, and an internet protocol profile, the auto-bandwidth value being further set based on a committed data rate for the label switched path.

9. An apparatus comprising:
    at least one processor; and
    at least one memory including computer program code for one or more programs,
    the at least one memory and the computer program code configured to, with the at least one processor, cause the apparatus to perform at least the following,
    set a predetermined delta value to control the adjustment threshold value to an auto-bandwidth value,
    determine an incremental bandwidth value using an adjustment threshold value,
    determine a minimum adjustment value based on the predetermined delta value and the incremental bandwidth value, and
    adjust the auto-bandwidth value according to the greater of the minimum adjustment value or the incremental bandwidth value.

10. An apparatus according to claim 9, wherein the adjustment threshold value specifies a desired headroom with respect to the auto-bandwidth value, and the apparatus is further caused to:
    sample current traffic to determine whether to adjust the auto-bandwidth according to the adjustment threshold.

11. An apparatus according to claim 9, wherein the adjustment to the auto-bandwidth value is an interim adjustment relating to a temporary fluctuation of a current traffic load.

12. An apparatus according to claim 11, wherein the apparatus is further caused to:

determine the auto-bandwidth value, wherein the auto-bandwidth value represents a current bandwidth allocation;

determine whether bandwidth utilization is increased or decreased based on a current load configuration to execute the adjustment to the auto-bandwidth value.

13. An apparatus according to claim 11, wherein the apparatus is further caused to:

configure an auto-bandwidth interval; and determine expiration of the auto-bandwidth interval to perform the adjustment to the auto-bandwidth value.

14. An apparatus according to claim 9, wherein the auto-bandwidth value specifies bandwidth allocation relating to a label switched path.

15. An apparatus according to claim 14, wherein the auto-bandwidth value is set according to an allocation scheme based on a plurality of profiles specifying percentages for a plurality of traffic classes.

16. An apparatus according to claim 15, wherein the profiles include an Ethernet virtual private line profile, a virtual private LAN (local area network) profile, and an internet protocol profile, the auto-bandwidth value being further set based on a committed data rate for the label switched path.

17. An apparatus according to claim 9, wherein the apparatus is resident in an edge device configured to interface with a data network, the edge device including a router.

18. An apparatus according to claim 9, wherein the apparatus is resident in a network management system configured to interface with a data network, the edge device including a router.

19. A system comprising:

a plurality of nodes configured to establish a label-switched path tunnel; and a network management node including an auto-bandwidth logic configured to determine a current traffic load over the tunnel, wherein the auto-bandwidth logic is further configured to selectively adjust bandwidth allocation for the tunnel according to a headroom adjustment value to maintain a headroom bandwidth relative to the current traffic load, to determine an incremental bandwidth value using the headroom adjustment value, to determine a minimum adjustment value based on a predetermined delta value and the incremental bandwidth value, and to adjust the bandwidth allocation according to either the minimum adjustment value or the incremental bandwidth value.

* * * * *